US008922356B2

(12) United States Patent
Lambert et al.

(10) Patent No.: US 8,922,356 B2

(45) Date of Patent: Dec. 30, 2014

(54) ENTRYWAY CONTROL AND MONITORING SYSTEM

(75) Inventors: Craig A. Lambert, Macomb, MI (US); Lei Hua, Troy, MI (US)

(73) Assignee: General Motors LLC, Detroit, MI (US)

( * ) Notice: Subject to any disclaimer, the term of this patent is extended or adjusted under 35 U.S.C. 154(b) by 192 days.

(21) Appl. No.: 13/324,953

(22) Filed: Dec. 13, 2011

(65) Prior Publication Data

US 2013/0147616 A1 Jun. 13, 2013

(51) Int. Cl.

*B60R 25/10* (2013.01)
*B60Q 1/00* (2006.01)
*G05B 19/00* (2006.01)
*H04Q 9/00* (2006.01)
*G05D 1/00* (2006.01)
*H04B 1/06* (2006.01)

(52) U.S. Cl.

USPC .................. 340/426.1; 340/424.15; 340/5.71; 340/5.7; 340/5.64; 701/2; 455/352

(58) Field of Classification Search

CPC ........... B64C 39/024; B64C 2201/146; G05D 1/0011; G07C 5/008; E05Y 2900/106

USPC ................ 340/426.1, 424.15, 5.71, 5.7, 5.64; 701/2; 455/352

See application file for complete search history.

(56) References Cited

U.S. PATENT DOCUMENTS 5,201,067 A 4/1993 Grube et al.
5,557,254 A * 9/1996 Johnson et al. .......... 340/426.19
5,608,778 A 3/1997 Partridge, III
5,627,529 A * 5/1997 Duckworth et al. ....... 340/12.24
6,072,402 A 6/2000 Kniffin et al.
6,127,922 A * 10/2000 Roddy et al. ............. 340/426.14
6,161,005 A 12/2000 Pinzon
6,278,869 B1 8/2001 Lindenmeier et al.
6,295,448 B1 9/2001 Hayes, Jr. et al.
6,308,083 B2 10/2001 King
6,377,173 B1 * 4/2002 Desai ....................... 340/426.36
6,853,894 B1 2/2005 Kolls
6,885,285 B2 4/2005 Losey
6,988,977 B2 1/2006 Webber et al.
7,031,665 B1 4/2006 Trell
7,034,657 B2 * 4/2006 Ueda et al. ................... 340/5.62
7,071,813 B2 7/2006 Fitzgibbon
7,079,016 B2 * 7/2006 Ho et al. .................. 340/426.25
7,088,265 B2 8/2006 Tsui et al.
7,170,426 B2 1/2007 Tsui et al.
7,205,908 B2 4/2007 Tsui et al.
7,224,275 B2 5/2007 Fitzgibbon
7,312,691 B2 12/2007 Zambo et al.
2001/0016501 A1 8/2001 King
2002/0146999 A1 10/2002 Witte (Continued)

*Primary Examiner* — George Bugg
*Assistant Examiner* — Munear Akki
(74) *Attorney, Agent, or Firm* — Dierker & Associates, P.C.

(57) ABSTRACT

An entryway control and monitoring system includes a remote controller to open and close an entryway and a telematics unit. The remote controller and the telematics unit are each disposed in a vehicle. The system further includes any of i) a vehicle bus that operatively connects the remote controller to the telematics unit, or ii) respective short range wireless connection units disposed in each of the remote controller and the telematics unit that selectively operatively connect the remote controller and the telematics unit. Computer readable code embedded on a non-transitory, tangible computer readable medium is executable by a processor of the telematics unit to at least one of control or monitor an operation of the remote controller.

16 Claims, 4 Drawing Sheets

(56) References Cited

U.S. PATENT DOCUMENTS

| | | | |
|---|---|---|---|
| 2003/0046541 A1 | 3/2003 | Gerdes et al. | |
| 2003/0208386 A1 | 11/2003 | Brondrup | |
| 2004/0085195 A1* | 5/2004 | McKibbon | 340/426.36 |
| 2004/0186995 A1 | 9/2004 | Yim et al. | |
| 2004/0203379 A1 | 10/2004 | Witkowski et al. | |
| 2004/0239482 A1 | 12/2004 | Fitzgibbon | |
| 2005/0060067 A1* | 3/2005 | Nishida | 701/2 |
| 2005/0119827 A1 | 6/2005 | Willer et al. | |
| 2005/0206497 A1 | 9/2005 | Tsui et al. | |
| 2006/0143463 A1 | 6/2006 | Ikeda et al. | |
| 2006/0202799 A1 | 9/2006 | Zambo | |
| 2006/0232131 A1* | 10/2006 | Endo | 307/10.2 |
| 2007/0082706 A1 | 4/2007 | Campbell et al. | |
| 2007/0216516 A1* | 9/2007 | Ghabra et al. | 340/5.64 |
| 2009/0163140 A1 | 6/2009 | Packham et al. | |
| 2010/0321203 A1 | 12/2010 | Tieman et al. | |
| 2011/0205040 A1* | 8/2011 | Van Wiemeersch et al. | 340/426.1 |
| 2012/0203619 A1* | 8/2012 | Lutnick et al. | 705/14.35 |
| 2012/0259771 A1* | 10/2012 | Hwang et al. | 705/39 |

* cited by examiner

ENTRYWAY CONTROL AND MONITORING SYSTEM

TECHNICAL FIELD

The present disclosure relates generally to entryway control and monitoring systems.

BACKGROUND

Some automobiles are equipped with one or more embedded remote controllers, such as, e.g., an embedded universal garage door opener. Once programmed, the controller may be used to open and close a door (e.g., a garage door) of an entryway (e.g., a garage connected to the vehicle user's residence) when the controller is activated.

SUMMARY

An entryway control and monitoring system is disclosed herein. The system includes a remote controller for opening and closing the entryway and a telematics unit. The remote controller and the telematics unit are each disposed in a vehicle. The system further includes any of i) a vehicle bus that operatively connects the remote controller to the telematics unit, or ii) respective short range wireless connection units disposed in each of the remote controller and the telematics unit that selectively operatively connect the remote controller and the telematics unit. Computer readable code embedded on a non-transitory, tangible computer readable medium is executable by a processor of the telematics unit to at least one of control or monitor an operation of the remote controller.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
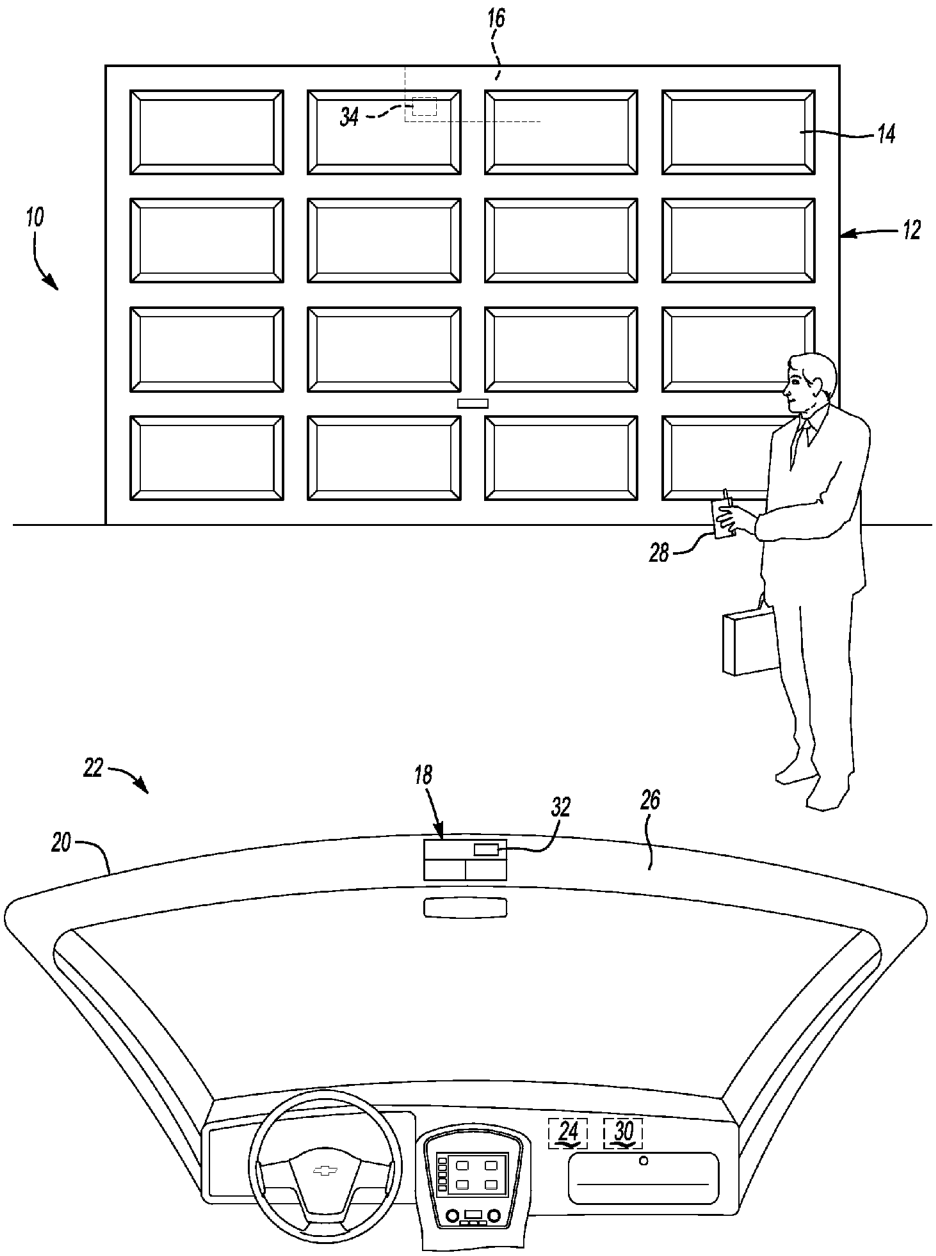
FIG. 1 is a schematic diagram depicting an example of an entryway control and monitoring system according to an example of the present disclosure.

Example(s) of the system may be used to control and monitor an entryway. As used herein, an "entryway" refers to an access point into a space, and entry into the space through the access point may be limited by an obstruction, such as a door. It is to be understood that the obstruction may partially block the entryway, and during these instances, limited access into the space may be available through the entryway. For example, a door that is partially open may enable a person or an animal to enter the space through the entryway, whereas a mobile vehicle (e.g., a car) may be too large to fit through the entryway that is being partially blocked by the door. It is further to be understood that passage through the entryway is not available in instances where the entryway is completely blocked by the obstruction (i.e., the door is closed).

In an example, the space including the entryway may define a residence (e.g., a person's home), a business (e.g., a restaurant, a store, etc.), a storage area (e.g., a garage, a barn, etc.), and/or the like. Further, the obstruction may be a door, examples of which include a door that swings via one or more hinges (e.g., a front door, side door, and/or back door of a residence) and a door guided by one or more rails (e.g., a garage door). In one particular example, the entryway is an access point into a garage of a person's residence or business, and the obstruction is a garage door designed to block the entryway to the garage when the garage door is closed. The garage door is further designed to permit access into the garage through the entryway when the garage door is at least partially open.

In some examples, the system may be used to control the entryway; namely to control the blocking and unblocking of the entryway by the obstruction (e.g., the door) so that an entity (e.g., a person, a vehicle, a bicycle, etc.) can enter the space (e.g., the garage) through the entryway. In an example, the entity may be able to move the obstruction via some physical means, and once moved, the entity may pass through the entryway and enter the space. This may be accomplished, e.g., by physically unlocking the obstruction (via, e.g., a key) and then applying a physical force to move the obstruction into an opened position (i.e., so that the obstruction no longer blocks the entryway). In another example, the obstruction may be moved electronically, e.g., by actuating a controller that is associated with a motorized opening mechanism operatively connected to the obstruction. Upon actuating the controller, the obstruction may be moved from an opened position to a closed position, and visa versa. In one example, the controller may be associated with a garage door opening mechanism, and may be referred to herein as a remote controller for a garage door opener.

In the examples of the system disclosed herein, the entryway may be controlled by actuating the remote controller to move the obstruction (e.g., a door) to an opened position so that an entity can pass through the entryway. The obstruction may also be moved, via actuating the remote controller, from an opened position to a closed position in order to block the entryway. In an example, the remote controller is disposed in a vehicle, and is in operative communication with an in-vehicle telematics unit over a vehicle data network (e.g., a vehicle bus). The telematics unit may be in direct communication with the remote controller via the vehicle bus, or a gateway (e.g., a body control module) may be used to gate messaging between the telematics unit and the remote controller that are connected to different serial busses. In response to a user request, the remote controller may be actuated on demand by the telematics unit of the vehicle to open or close the door. In this way, the actuation of the remote controller does not require any physical effort on behalf of the user (e.g., the vehicle owner), and this may be useful when a user of the vehicle is, e.g., locked out of his/her vehicle and desires access into or out of his/her garage.

In other examples of the system, the entryway may be monitored, e.g., to detect any unauthorized attempts to obtain some access to the entryway that is then-currently being blocked by the obstruction (e.g., a closed door). These examples of the system also utilize the remote controller that is disposed inside the vehicle and is in operative communication with the telematics unit. However, for monitoring the entryway, the remote controller communicates with the telematics unit when an unauthorized attempt to access the entryway has been detected. Upon receiving this communication, the telematics unit may notify an entity external to the vehicle (e.g., a telematics service center) of the unauthorized attempt to access, e.g., the garage through the entryway.

Details of the system, and of the methods for controlling and monitoring an entryway using the system will be now described herein in conjunction with FIGS. 1-4.

At the outset, the term "user", as used herein, includes a vehicle owner, a vehicle driver, and/or a vehicle passenger. In some instances, the user is also an owner or authorized user of a space, such as, e.g., a residence, a business, a storage area, and/or the like. As an owner or authorized user, the user is authorized to access an entryway of the space.

In instances where the user is the vehicle owner, the term "user" may also be used interchangeably with the terms subscriber and/or service subscriber.

Further, the term "communication" is to be construed to include all forms of communication, including direct and indirect communication. Indirect communication may include communication between two components with additional component(s) located therebetween.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Referring now to the figures, an example of an entryway control and monitoring system 10 is semi-schematically shown in FIG. 1. The system 10 includes a space (e.g., a garage of the user's residence) that includes an entryway 12 covered by a garage door 14. The garage door 14 may be opened and closed by actuating a motorized garage door opener or opening mechanism 16, which is operatively connected to the garage door 14 and is located inside the space. When the garage door opener 16 is actuated, it automatically controls the movement of the garage door 14 between open and closed positions or to any spot between the open and closed positions.

In an example, the garage door opener 16 may be actuated by activating a remote controller 18 that, as shown in FIG. 1, is operatively disposed in a passenger compartment 20 of a mobile vehicle 22. The remote controller 18 is also in selective and operative communication with a telematics unit 24 that is also disposed in the vehicle 22. Communication between the remote controller 18 and the telematics unit 24 may be accomplished via a vehicle data network or bus (identified by reference numeral 134 in FIG. 2). The vehicle bus 134 will be described in further detail in conjunction with FIG. 2.

In the example depicted in FIG. 1, the vehicle 22 is a land vehicle of the type that includes the passenger compartment 20. Examples of these types of land vehicles include cars, trucks, recreational vehicles (RVs), and the like. In this example, the remote controller 18 is disposed inside the passenger compartment 20 of the vehicle 22, and may be used to control an entryway of a land structure, such as, e.g., the garage door 14 as shown in FIG. 1.

It is to be understood that the vehicle 22 may, in another example, be a land vehicle of the type that does not have a passenger compartment, an example of which includes a motorcycle. The remote controller 18 may, in this example, be disposed anywhere near a driver control area, such as on the handle bars of the motorcycle.

The vehicle 22 may otherwise be a water vehicle (such as a boat) or an air vehicle (such as a plane, a helicopter, or the like). As a water vehicle, the vehicle 22 may have a driver control area that is either uncovered or is enclosed to form a passenger compartment. For any of these configurations, the remote controller 18 may be disposed in the driver control area of the water vehicle, and may be used to control, e.g., a door of an entryway of some type of water-based structure. Examples of a water-based structure may include a boat house or marina having a garage door. In instances where the vehicle 22 is an air vehicle, the vehicle 22 may include a cockpit or other enclosed pilot control area within which the remote controller 18 may be operatively disposed. In this example, the remote controller 18 may be configured to control the movement of, e.g., a door of an airplane hangar or the like.

The vehicle 22 is generally equipped with suitable hardware and software that enables the vehicle 22, via its telematics unit 24, to communicate (e.g., transmit and/or receive voice and data communications) with entities outside of the vehicle 22. These communications may be established using a carrier/communication system, such as the system 116 shown and described below in conjunction with FIG. 2. As part of the hardware 126 (also shown in FIG. 2) of the vehicle 22, the vehicle data network or bus 134 may enable the telematics unit 24 to also communicate with various vehicle systems and/or components. In one example, the vehicle bus 134 (alone or in combination with a body control module 133 that connects with another serial bus 151, shown in dotted lines in FIG. 2) enables the telematics unit 24 to talk to and/or communicate with the remote controller 18 of the garage door opener 16. Examples of other vehicle hardware components 126, including the telematics unit 24, are generally shown and described in some detail in conjunction with FIG. 2 below.

It is to be understood that the remote controller 18 may be installed anywhere inside the passenger compartment 20 of the vehicle 22. In one example, the remote controller 18 may be placed on/in an overhead panel 26 of the vehicle 22 as shown in FIG. 1. The remote controller 18 may be placed in other locations inside the passenger compartment 20, but typically is within the reach of a vehicle driver or other front seat occupant. Examples of other locations inside the passenger compartment 20 that can contain or otherwise hold the remote controller 18 include the steering wheel, a center console disposed between the driver and passenger seats of the vehicle 22, an inner panel of the driver-side door, the dashboard, and/or the like.

The remote controller 18 may be embodied as any suitable controller having some type of feature (such as, e.g., a button or switch) that, when activated, triggers a transmission of a radio frequency (RF) signal to the garage door opener 16. In an example, the RF signal transmission may be accomplished via a transmitter 32 operatively attached to the controller 18, and the RF signal may be received by a receiver 34 operatively attached to the garage door opener 16. In another example, the remote controller 18 may be voice activated, where upon detecting a verbal command, the controller 18 (via the transmitter 32) transmits the RF signal to the garage door opener 16. Upon receiving the RF signal by the receiver 34, a processor (not shown) associated with the garage door opener 16 executes a command to open or close the garage door 14.

In an example, the remote controller 18 may include a single actuatable feature that, when actuated, causes the transmitter 32 to transmit an RF signal to the garage door opener 16 to open or close the garage door 14. It is to be understood that, in this example, the opening and closing of the garage door 14 depends, at least in part, on the initial position of the garage door 14 at the time the RF signal is received. For instance, if the garage door 14 is initially positioned in an at least partially open position, then upon receiving the RF signal from the transmitter 32 of the controller 18, the processor of the garage door opener 16 executes a command to move the garage door 14 so that the door closes. If, on the other hand, the garage door 14 is initially positioned in a closed position, then upon receiving the RF signal from the transmitter 32, the processor of the garage door opener 16 executes a command to move the garage door 14 so that the door at least partially opens.

In another example, the remote controller 18 may include one actuatable feature for closing the garage door 14 and another actuatable feature for opening the garage door 14. In other words, two separate buttons, two separate voice commands, or the like may be used as the actuatable features for the activation of the respective opening and closing commands. Thus, in this example, the opening and closing of the garage door 14 depends upon which one of the actuatable features of the controller 18 is being actuated.

Figure 2:
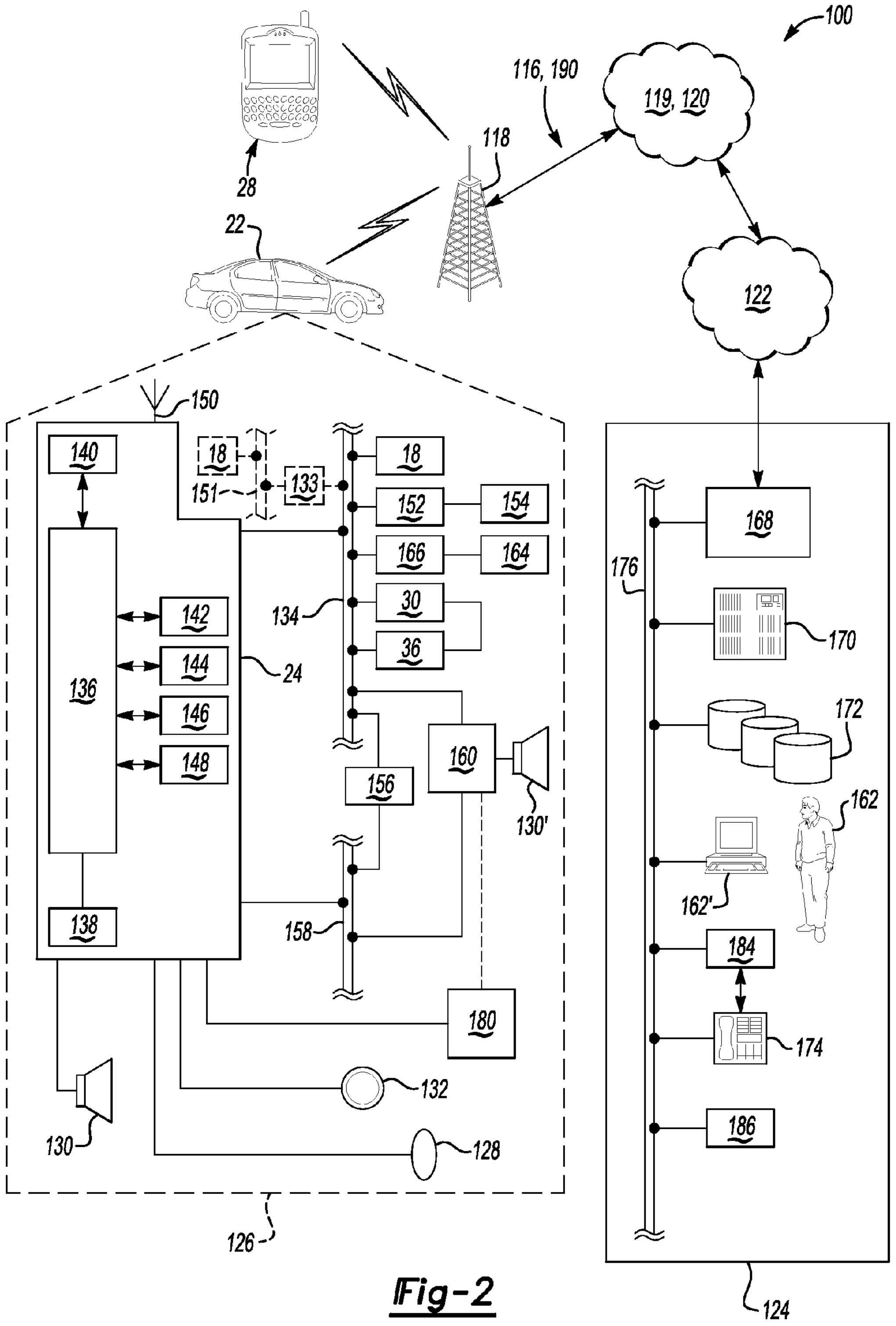
FIG. 2 is a schematic diagram depicting an example of a system within which an example of the entryway control and monitoring system may be incorporated.

In instances where the system 10 is used to control the entryway 12, the actuatable feature(s) of the remote controller 18 may be activated by a signal produced by the telematics unit 24. For instance, the telematics unit 24 may submit a command signal to the remote controller 18 via the vehicle bus 134, and this command signal is generated by the telematics unit 24 in response to a request to do so by a telematics service center 124 (which is shown in FIG. 2). In another instance, the telematics unit 24 may send a message directly to the remote controller 18 using a short range wireless connection that connects the telematics unit 24 with the remote controller 18. In this instance, the remote controller 18 may be configured with short range wireless connection capabilities (such as a short range wireless connection component (not shown)) that enables the controller 18 to establish short range wireless connections (e.g., BLUETOOTH® connections using, for example, SPP (serial port profile) protocol) with other communications devices, such as the telematics unit 24. In yet another instance, the telematics unit 24 may submit a message to the remote controller 18 using an SAE J9139 protocol.

The request may have been submitted to the telematics service center 124 by the vehicle owner/user using a communications device 28. The communications device 28 may be a mobile communications device (such as, e.g., a cellular phone or a smartphone) or a stationary communications device (such as, e.g., a landline phone). Upon receiving the request, the service center 124, in turn, sends a data message (e.g., a packet data message) to the telematics unit 24, where such data message includes the user's request. The method for controlling the entryway 12 will be described further in conjunction with FIG. 3 below.

In an example, the vehicle 22 is also configured with a security system 30 that, when activated, sets the vehicle 22 into an armed state. In an example, the security system 30 may include a vehicle alarm 36 that is operatively connected to the security system 30 (as shown in FIG. 2), where the alarm 36, when triggered, emits a high volume sound or siren. The alarm 36 may otherwise take the form of a verbal warning or statement, such as, e.g., "Please stay away from the vehicle!" or the like. In some cases, the alarm 36 may be a visual alarm, such as flashing interior and/or exterior vehicle lights. The visual alarm may be used in addition to, or in place of the audible alarm when the alarm 36 is triggered.

The vehicle security system 30 may be activated by the user, for example, when the vehicle ignition system is set to an OFF state (e.g., by powering off the vehicle 22) and activating a door-lock function. The door-lock function may be activated by actuating a door-locking button disposed on the driver- or passenger-side door, by actuating a door-locking function button on a key fob, or by other suitable methods. The vehicle 22 may otherwise be placed in an armed state by actuating a separate in-vehicle security system 30, which is not connected to or associated with the vehicle ignition and the door-locking systems. It is to be understood that the security system 30 may be particularly useful in the examples of the instant disclosure for monitoring the entryway 12, which will be described below in conjunction with FIG. 4.

FIG. 2 is an example of a system 100 within which the entryway control and monitoring system 10 may be incorporated. The system 100 generally includes the mobile vehicle 22 including the remote controller 18 and the telematics unit 24 operatively disposed therein, and the carrier/communication system 116 mentioned above.

The carrier/communication system 116 includes one or more cell towers 118, one or more base stations 119 and/or mobile switching centers (MSCs) 120, and one or more service providers (e.g., 190) including mobile network operators (s). The system 100 further includes one or more land networks 122, and one or more telematics service/call centers 124. In an example, the carrier/communication system 116 is a two-way radio frequency communication system, and may be configured with a web service supporting system-to-system communications (e.g., communications between the service center 124 and the service provider 190).

The following paragraphs provide a brief overview of one example of the system 100. It is to be understood, however, that additional components and/or other systems not shown here could employ the system 10, and the method(s) for using the system 10 as disclosed herein.

Some of the vehicle hardware 126 is shown generally in FIG. 2, and includes the telematics unit 24 and other components that are operatively connected to the telematics unit 24. One example of a hardware component is the remote controller 18, as previously mentioned. Other examples of the hardware components include a microphone 128, speakers 130, 130', and buttons, knobs, switches, keyboards, and/or controls 132. Generally, these hardware 126 components enable a user to communicate with the telematics unit 24 and any other system 100 components in communication with the telematics unit 24. It is to be understood that the vehicle 22 may also include additional components suitable for use in, or in connection with, the telematics unit 24.

Operatively coupled to the telematics unit 24 is the network connection or vehicle bus 134. Examples of suitable network connections include a controller area network (CAN), a media oriented system transfer (MOST), a local interconnection network (LIN), an Ethernet, and other appropriate connections, such as those that conform with known ISO, SAE, and IEEE standards and specifications, to name a few. The vehicle bus 134 enables the vehicle 22 to send and receive signals from the telematics unit 24 to various units of equipment and systems both outside the vehicle 22 and within the vehicle 22 to perform various functions, such as unlocking a door, executing personal comfort settings, and/or the like. In one example, the vehicle bus 134 enables the vehicle 22 to send and receive signals from the telematics unit 24 to the remote controller 18 (e.g., for controlling the entryway 12), and to send and receive signals from the remote controller 18 to the telematics unit 24 (e.g., during monitoring of the entryway 12).

In some instances, a gateway may be used to connect the in-vehicle telematics unit 24 that is operatively connected to the vehicle bus 134 to the remote controller 18 that is operatively connected to another bus 151. In this configuration, the gateway enables the transmission of serial data messages (e.g., a command to actuate the remote controller 18) between components of the different buses 134, 151 (e.g., the telematics unit 14 and the remote controller 18). In an example, the gateway is a body control module 133, which may be an electronic control unit that enables the communication between components connected to one serial bus (e.g., the remote controller 18 connected to the bus 151) with components connected to another serial bus (e.g., the telematics unit 14 connected to the vehicle bus 134).

The telematics unit 24 is an onboard vehicle dedicated communications device. In an example, the telematics unit 24 is linked to a telematics service center (e.g., the service center 124) via the carrier system 116, and is capable of calling and transmitting data to the service center 124.

The telematics unit 24 provides a variety of services, both individually and through its communication with the service center 124. The telematics unit 24 generally includes an electronic processing device 136 operatively coupled to one or more types of electronic memory 138, a cellular chipset/component 140, a wireless modem 142, a navigation unit containing a location detection (e.g., global positioning system (GPS)) chipset/component 144, a real-time clock (RTC) 146, a short-range wireless communication network 148 (e.g., a BLUETOOTH® unit), and a dual antenna 150. In one example, the wireless modem 142 includes a computer program and/or set of software routines (i.e., computer readable instructions embedded on a non-transitory, tangible medium) that are executable by the processing device 136.

It is to be understood that the telematics unit 24 may be implemented without one or more of the above listed components (e.g., the real time clock 146). It is to be further understood that telematics unit 24 may also include additional components and functionality as desired for a particular end use.

The electronic processing device 136 of the telematics unit 24 may be a micro controller, a controller, a microprocessor, a host processor, and/or a vehicle communications processor. In another example, electronic processing device 136 may be an application specific integrated circuit (ASIC). Alternatively, electronic processing device 136 may be a processor working in conjunction with a central processing unit (CPU) performing the function of a general-purpose processor. The electronic processing device 136 (also referred to herein as a processor) may, for example, include software programs having computer readable code to initiate and/or perform various functions of the telematics unit 24, as well as computer readable code for performing various steps of the examples of the method for controlling the entryway 12 and the examples of the method for monitoring the entryway 12.

Still referring to FIG. 2, the location detection chipset/component 144 may include a Global Position System (GPS) receiver, a radio triangulation system, a dead reckoning position system, and/or combinations thereof. In particular, a GPS receiver provides accurate time and latitude and longitude coordinates of the vehicle 22 responsive to a GPS broadcast signal received from a GPS satellite constellation (not shown).

The cellular chipset/component 140 may be an analog, digital, dual-mode, dual-band, multi-mode and/or multi-band cellular phone. Basically, the cellular chipset 140 is a semiconductor engine that enables the telematics unit 24 to connect with other devices (e.g., other mobile communications devices, e.g., 28) using some suitable type of wireless technology. The cellular chipset-component 140 uses one or more prescribed frequencies in the 800 MHz analog band or in the 800 MHz, 900 MHz, 1900 MHz and higher digital cellular bands. In some cases, the cellular chipset/component 140 may also use a frequency below 800 MHz, such as 700 MHz or lower. In yet other cases, the cellular chipset/component 140 may use a frequency above 2600 MHz. Any suitable protocol may be used, including digital transmission technologies, such as TDMA (time division multiple access), CDMA (code division multiple access), GSM (global system for mobile telecommunications), and LTE (long term evolution). In some instances, the protocol may be short range wireless communication technologies, such as BLUETOOTH®, dedicated short range communications (DSRC), or Wi-Fi™. In other instances, the protocol is Evolution Data Optimized (EVDO) Rev B (3G) or Long Term Evolution (LTE) (4G). In an example, the cellular chipset/component 140 may be used in addition to other components of the telematics unit 24 to establish communications between the vehicle 22 and another party.

Also associated with electronic processing device 136 is the previously mentioned real time clock (RTC) 146, which provides accurate date and time information to the telematics unit 24 hardware and software components that may require and/or request date and time information. In an example, the RTC 146 may provide date and time information periodically, such as, for example, every ten milliseconds.

The electronic memory 138 of the telematics unit 24 may be configured to store data associated with the various systems of the vehicle 22, vehicle operations, vehicle user preferences and/or personal information, and the like.

The telematics unit 24 provides numerous services alone or in conjunction with the service center 124, some of which may not be listed herein, and is configured to fulfill one or more user or subscriber requests. Several examples of these services include, but are not limited to: turn-by-turn directions and other navigation-related services provided in conjunction with the GPS based chipset/component 144; airbag deployment notification and other emergency or roadside assistance-related services provided in connection with various crash and or collision sensor interface modules 152 and sensors 154 located throughout the vehicle 22; and infotainment-related services where music, Web pages, movies, television programs, videogames and/or other content is downloaded by an infotainment center 156 operatively connected to the telematics unit 24 via vehicle bus 134 and audio bus 158. In one example, downloaded content is stored (e.g., in memory 138) for current or later playback.

Again, the above-listed services are by no means an exhaustive list of all the capabilities of telematics unit 24, but are simply an illustration of some of the services that the telematics unit 24 is capable of offering. It is to be understood that when these services are obtained from the service center 124, the telematics unit 24 is considered to be operating in a telematics service mode.

Vehicle communications generally utilize radio transmissions to establish a voice channel with carrier system 116 such that both voice and data transmissions may be sent and received over the voice channel. Vehicle communications are enabled via the cellular chipset/component 140 for voice communications and the wireless modem 142 for data transmission. In order to enable successful data transmission over the voice channel, wireless modem 142 applies some type of encoding or modulation to convert the digital data so that it can communicate through a vocoder or speech codec incorporated in the cellular chipset/component 140. It is to be understood that any suitable encoding or modulation technique that provides an acceptable data rate and bit error may be used with the examples disclosed herein. In one example, an Evolution Data Optimized (EVDO) Rev B (3G) system (which offers a data rate of about 14.7 Mbit/s) or a Long Term Evolution (LTE) (4G) system (which offers a data rate of up to about 1 Gbit/s) may be used. These systems permit the transmission of both voice and data simultaneously. Generally, dual mode antenna 150 services the location detection chipset/component 144 and the cellular chipset/component 140.

The microphone 128 provides the user with a means for inputting verbal or other auditory commands, and can be equipped with an embedded voice processing unit utilizing human/machine interface (HMI) technology known in the art. Conversely, speaker(s) 130, 130' provide verbal output to the vehicle occupants and can be either a stand-alone speaker 130 specifically dedicated for use with the telematics unit 24 or can be part of a vehicle audio component 160, such as speaker 130'. In either event and as previously mentioned, microphone 128 and speaker(s) 130, 130' enable vehicle hardware 126 and telematics service center 124 to communicate with the occupants through audible speech. The vehicle hardware 126 also includes one or more buttons, knobs, switches, keyboards, and/or controls 132 for enabling a vehicle occupant to activate or engage one or more of the vehicle hardware components. In one example, one of the buttons 132 may be an electronic pushbutton used to initiate voice communication with the telematics service provider service center 124 (whether it be a live advisor 162 or an automated call response system 162') to request services, to initiate a voice call to another mobile communications device, etc.

The audio component 160 is operatively connected to the vehicle bus 134 and the audio bus 158. The audio component 160 receives analog information, rendering it as sound, via the audio bus 158. Digital information is received via the vehicle bus 134. The audio component 160 provides AM and FM radio, satellite radio, CD, DVD, multimedia and other like functionality independent of the infotainment center 156. Audio component 160 may contain a speaker system (e.g., speaker 130'), or may utilize speaker 130 via arbitration on vehicle bus 134 and/or audio bus 158.

Still referring to FIG. 2, the vehicle crash and/or collision detection sensor interface 152 is/are operatively connected to the vehicle bus 134. The crash sensors 154 provide information to the telematics unit 24 via the crash and/or collision detection sensor interface 152 regarding the severity of a vehicle collision, such as the angle of impact and the amount of force sustained.

Other vehicle sensors 164, connected to various sensor interface modules 166 are operatively connected to the vehicle bus 134. Example vehicle sensors 164 include, but are not limited to, gyroscopes, accelerometers, speed sensors, magnetometers, emission detection and/or control sensors, environmental detection sensors, and/or the like. Examples of sensor interface modules 166 include powertrain control, climate control, body control, and/or the like.

The vehicle hardware 126 may also include the display 180, which may be operatively directly connected to or in communication with the telematics unit 24, or may be part of the audio component 160. The display 180 may be any human-machine interface (HMI) disposed within the vehicle 22 that includes audio, visual and/or haptic capabilities. The display 180 may, in some instances, be controlled by or in network communication with the audio component 160, or may be independent of the audio component 160. Examples of the display 180 include a VFD (Vacuum Fluorescent Display), an LED (Light Emitting Diode) display, a driver information center display, a radio display, an arbitrary text device, a heads-up display (HUD), a touchscreen display, an LCD (Liquid Crystal Display) display, and/or the like. The display 180 may be referred to herein as a graphic user interface (GUI).

It is to be understood that the vehicle 22 also includes other components, such as the remote controller 18 as previously mentioned. Again, the remote controller 18 may be considered to be part of the vehicle hardware 126, and is operatively directly or indirectly connected to or in communication with the telematics unit 24.

As mentioned above, the system 100 includes the carrier/communication system 116. A portion of the carrier/communication system 116 may be a cellular telephone system or any other suitable wireless system that transmits signals between the vehicle hardware 126 and land network 122. According to an example, the wireless portion of the carrier/communication system 116 includes one or more cell towers 118, base stations 119 and/or mobile switching centers (MSCs) 120, as well as any other networking components required to connect the wireless portion of the system 116 with land network 122. It is to be understood that various cell tower/base station/MSC arrangements are possible and could be used with the wireless portion of the system 116. For example, a base station 119 and a cell tower 118 may be co-located at the same site or they could be remotely located from one another; or a single base station 119 may be coupled to various cell towers 118; or various base stations 119 could be coupled with a single MSC 120. A speech codec or vocoder may also be incorporated in one or more of the base stations 119, but depending on the particular architecture of the wireless network 116, it could be incorporated within an MSC 120 or some other network components as well.

Land network 122 may be a conventional land-based telecommunications network that is connected to one or more landline telephones, and that connects the wireless portion of the carrier/communication network 116 to the call/data center 124. For example, land network 122 may include a public switched telephone network (PSTN) and/or an Internet protocol (IP) network. It is to be understood that one or more segments of the land network 122 may be implemented in the form of a standard wired network, a fiber or other optical network, a cable network, wireless networks, such as wireless local networks (WLANs) or networks providing broadband wireless access (BWA), or any combination thereof.

The service center 124 of the telematics service provider (also referred to herein as a call center) is designed to provide the vehicle hardware 126 with a number of different system back-end functions. According to the example shown in FIG. 2, the service center 124 generally includes one or more switches 168, servers 170, databases 172, live and/or automated advisors 162, 162', processing equipment (or processor) 184, a communications module 186, as well as a variety of other telecommunication and computer equipment 174. These various service center components are coupled to one another via a network connection or bus 176, such as one similar to the vehicle bus 134 previously described in connection with the vehicle hardware 126.

The processor 184, which is often used in conjunction with the computer equipment 174, is generally equipped with suitable software and/or programs enabling the processor 184 to accomplish a variety of service center functions. Further, the various operations of the service center 124 are carried out by one or more computers (e.g., computer equipment 174) programmed to carry out some of the tasks of the service center 124. The computer equipment 174 (including computers) may include a network of servers (including server 170) coupled to both locally stored and remote databases (e.g., database 172) of any information processed. The processor 184 may be configured to run computer program code encoded on a non-transitory, tangible medium to perform some of the steps of the controlling and monitoring methods described in detail below.

Switch 168, which may be a private branch exchange (PBX) switch, routes incoming signals so that voice transmissions are usually sent to either the live advisor 162 or the automated response system 162', and data transmissions are passed on to a modem (similar to modem 142) or other piece of equipment (not shown) for demodulation and further signal processing. The modem preferably includes an encoder, as previously explained, and can be connected to various devices such as the server 170 and database 172.

The communications module 186 is configured, via suitable communications equipment (such as equipment capable of handling messaging between the service center 124 and the telematics unit 24 (e.g., switches, switchboards, etc.), modems (e.g., a wireless modem similar to modem 142), TCP/IP supporting equipment, and/or the like), to enable the call center 124 to establish a communication with the telematics unit 24, the communications device 28, or visa versa. The communications module 186 is capable of receiving message (s) (i.e., packet data) from the communications device 28, where such message(s) may include a request to activate the remote controller 18 for the garage door opener 16. The communications module 186 is also capable of sending message(s) to the telematics unit 24 (e.g., as packet data) with a command to execute the request (i.e., to activate the remote controller 18). Further, the communications module 186 may send message(s) to the communications device 28, where such message(s) contain a notification that an unauthorized attempt to access the entryway 12 has occurred.

It is to be appreciated that the service center 124 may be any central or remote facility, manned or unmanned, mobile or fixed, to or from which it is desirable to exchange voice and data communications. As such, the live advisor 162 may be physically present at the service center 124 or may be located remote from the service center 124 while communicating through the service center 124.

The communications network provider 190 generally owns and/or operates the carrier/communication system 116. The communications network provider 190 includes a mobile network operator that monitors and maintains the operation of the communications network 190. The network operator directs and routes calls, and troubleshoots hardware (cables, routers, network switches, hubs, network adaptors), software, and transmission problems. It is to be understood that, although the communications network provider 190 may have back-end equipment, employees, etc. located at the telematics service provider service center 124, the telematics service provider is a separate and distinct entity from the network provider 190. In an example, the equipment, employees, etc. of the communications network provider 190 are located remote from the service center 124. The communications network provider 190 provides the user with telephone and/or Internet services, while the telematics service provider provides a variety of telematics-related services (such as, for example, those discussed hereinabove). The communications network provider 190 may interact with the service center 124 to provide services (such as emergency services) to the user.

While not shown in FIG. 2, it is to be understood that in some instances, the service center 124 operates as a data center, which receives voice or data calls, analyzes the request associated with the voice or data call, and transfers the call to an application specific service center associated with the telematics service provider. In these instances, the telematics service provider may include a plurality of application specific service centers that each communicates with the data center 124, and possibly with each other. It is further to be understood that the application specific service center(s) may include all of the components of the data center 124, but is a dedicated facility for addressing specific requests, needs, etc. Examples of application specific service centers include emergency services service centers, navigation route service centers, in-vehicle function service centers, or the like.

Further, the service center 124 components shown in FIG. 2 may be configured as a Cloud Computer, i.e., an Internet- or world-wide-web-based computing environment. For example, the computer equipment 174 may be accessed as a Cloud platform service, or PaaS (Platform as a Service), utilizing Cloud infrastructure rather than hosting computer equipment 174 at the service center 124. The database 172 and server 170 may also be configured as a Cloud resource. The Cloud infrastructure, known as IaaS (Infrastructure as a Service) typically utilizes a platform environment as a service, which may include components such as the processor 184, database 172, server 170, and computer equipment 174. In an example, application software and services (such as, e.g., navigation route generation and subsequent delivery to the vehicle 22) may be performed in the Cloud via the SaaS (Software as a Service). Subscribers, in this fashion, may access software applications remotely via the Cloud. Further, subscriber service requests may be acted upon by the automated advisor 162', which may be configured as a service present in the Cloud.

Figure 3:
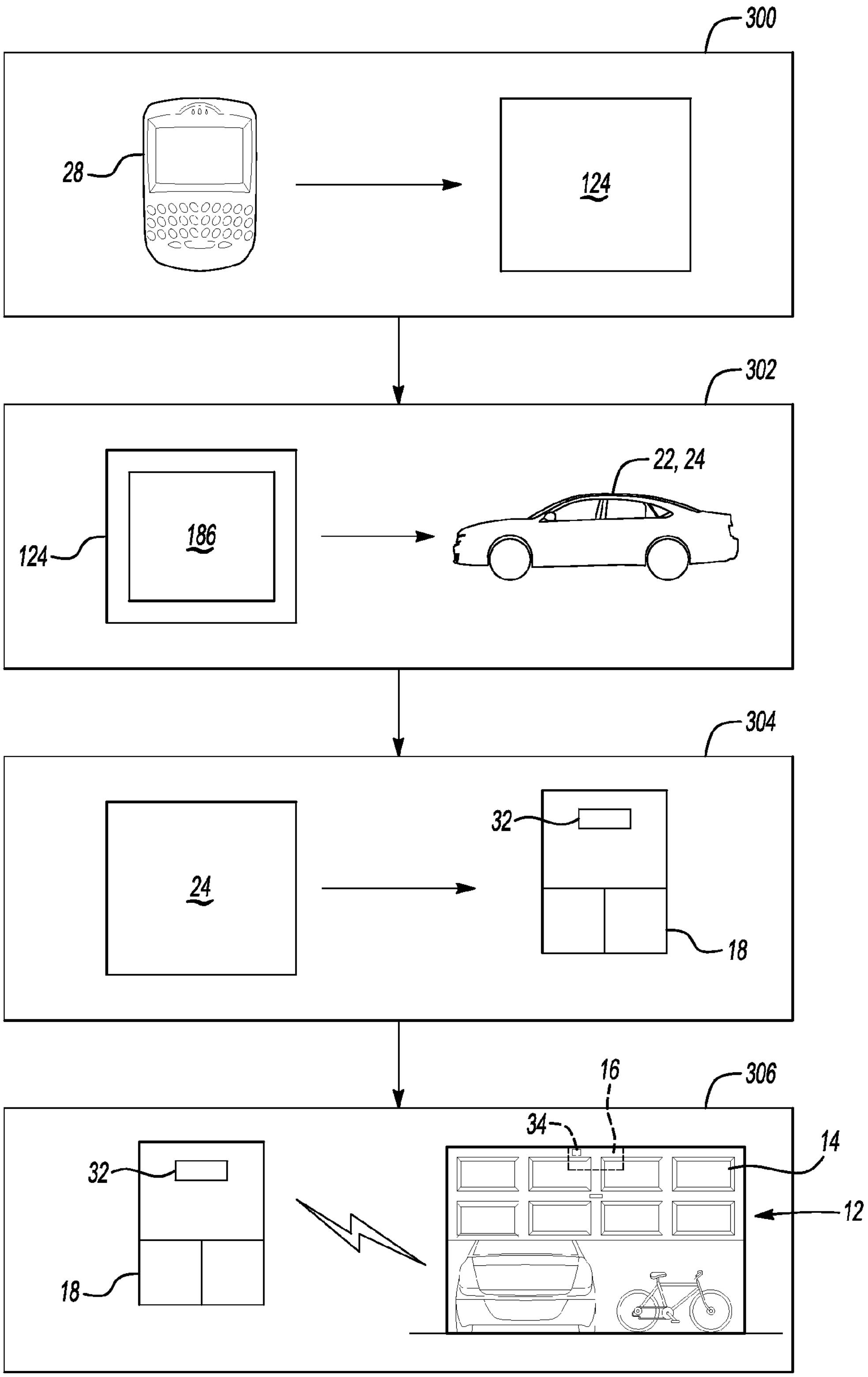
FIG. 3 is a flow diagram depicting an example of a method for controlling an entryway.

An example of a method for controlling an entryway (such as the entryway 12 to a garage of a user's residence) will now be described in conjunction with FIGS. 1-3. As mentioned above, access to the entryway 12 may be controlled by activating the remote controller 18, which then transmits an RF signal to the garage door opener 16 to open or close the garage door 14. It is to be understood that the activation of the remote controller 18 (which, as shown in FIG. 1, is disposed inside the passenger compartment 20 of the vehicle 22) may be accomplished, e.g., when the user is physically located outside of the vehicle 22 (i.e., outside of the passenger compartment 20). Thus, a user may be able to open and close the garage door 14 without physically activating the remote controller 18 (e.g., by physically pressing an actuatable feature/activation button on the remote controller 18). It is to be understood that the remote controller 18 may also be activated via the example of the control method described herein even when the user is physically located inside the vehicle 22. This situation may occur, e.g., when the remote controller 18 is out of reach of the user while the user is inside the passenger compartment 20 of the vehicle 22, when the actuatable feature of the remote controller 18 is not working properly (e.g., a broken button), and/or the like.

In an example of controlling the entryway 12, the user submits a request to the telematics service center 124 to activate the remote controller 18. When the remote controller 18 is activated, the garage door 14 either opens or closes, thereby enabling or denying access into the entryway 12. The submission of the request to activate the remote controller 18 is shown schematically at step 300 in FIG. 3. The request may be submitted by the user, for example, by calling the telematics service center 124 utilizing the communications device 28. The call may be initiated by dialing a phone number of the service center 124 (or of a particular department at the service center 124 or a particular application center associated with the service center 124), and a voice connection may be established when the call is answered by a service center advisor 162, 162'. During this voice connection, the user may verbally recite his/her request to the advisor 162, 162', and the advisor 162, 162' may fulfill the user's request himself/herself/itself. The advisor 162, 162' may otherwise transfer the call to an appropriate department of the service center 124 or to an appropriate application center associated with the service center 124 so that the user's request may be properly fulfilled.

It is to be understood that the user is authenticated before the request is actually fulfilled (or processed) by the service center advisor 162, 162'. In an example, the processor 184, running suitable computer program code, may attempt to match the phone number of the communications device 28 used to submit the request with a phone number in a user profile stored in one of the databases 172 at the service center 124. This user profile may have been set up when the user activated his/her account with the service center 124. The profile generally contains the details of the agreement established between the service center owner (i.e., telematics service provider) and the user, personal information of the user (e.g., the user's name, garage address, home phone number, cellular phone number, electronic mailing (e-mail) address, etc.), and authentication information. During the comparison, if the processor 184 finds that the two phone numbers (i.e., the phone number of the communications device 28 and the phone number stored in the user profile) match, the processor 184 may assume that the caller is an authorized user.

The user may otherwise be authenticated utilizing authorization information previously stored in the user profile, and the authorization information may include answers to prescribed challenges presented to a caller (e.g., the user). The prescribed challenges may include a question or request for information relating to personal information of the user, such as, e.g., "What is your mother's maiden name?", "What was the name of your first pet?", "Describe the color of your first car", and/or the like. The answers to these questions or requests (i.e., the personal or authorization information) are originally answered by the user, e.g., upon setting up his/her account with the service center 124, and the answers are stored in the user's profile. When the caller requests to activate the remote controller 18 to open/close the garage door 14, the caller may be presented with the challenges, and if answered correctly, the request will be processed by the service center advisor 162, 162'.

In another example, the user may use a mobile communications device 28 to submit a text message (e.g., a short message service (SMS) message) to the service center 124. This text message contains the user's request to open or close the entryway 12. In this case, the service center 124 (via the processor 184) may authenticate the message utilizing the phone number (or mobile dialing number (MDN)) of the device 28, and comparing the MDN to the phone number stored in the user profile. The user's request is processed if there is a match. In some cases, the service center 124 (via the communications module 186) may send a response message to the user's mobile communications device 28 that contains a confirmation that the request has been received and is currently being processed.

The user request may include a verbal command (for voice calls) or a text-based command (for text messages) to open or close the entryway 12. An example of the command may be something similar to "Please open my garage door", or the like. In instances where the request is a verbal request and is received by a human advisor 162, the advisor 162 will authenticate the caller and, if the caller is properly authenticated, then either i) process the request, or ii) obtain further information from the user if the advisor 162 is uncertain as to the particulars of the user's request. Once the advisor 162 has obtained enough information, the advisor 162 may refer to the user profile stored in the database 172 to obtain the mobile dialing number of the telematics unit 24 so that a message may be pushed to the telematics unit 24 to activate the remote controller 18.

In instances where the voice call is received by the automated advisor 162' (or automaton), or when the user sends a text message to the service center 124, the automaton 162' will determine, via suitable computer programs run by the processor 184, the exact nature of the request. In the example above, the nature of the user's call is that he/she wants his/her garage door opened. Assuming that the caller/text message has been properly authenticated, the automaton 162' will then proceed to process the user's request.

In an example, the communications device 28 is a mobile smartphone containing an application downloaded thereto from a website owned or run by the telematics service provider or from another online application store. This application may be used, by the user, to send his/her request to the service center 124 to open/close the entryway 12 (e.g., to open/close the garage door 14). The request may be received by the communications module 186, which may contain its own application for receiving the request from the communications device 28. The application resident on the communications module 186 may be specifically designed to recognize the request as a user request for opening/closing an entryway 12, and may further be configured to process the request without having to engage a service center advisor 162, 162'.

In still another example, the user may log on to a website owned or run by the telematics service provider. One of the services offered via the website may be to open or close the entryway 12 that is associated with a user's account. The request to open or close the entryway 12 may be submitted to the service center 124 via the website. In these instances, the user's authority is checked by virtue of the logging in process.

The request may be processed, for example, by generating a data message, and then transmitting the data message to the telematics unit 24. The data message may be generated by the processor 184 running suitable computer program code, and such data message may contain a command to activate the remote controller 18 disposed in the vehicle 22. Once generated, the data message is transmitted from the communications module 186 at the service center 124 (using, e.g., the application resident thereon) to the telematics unit 24 utilizing the mobile dialing number of the telematics unit 24. This step is shown at 302 in FIG. 3. In an example, the data message is transmitted to the telematics unit 24 as circuit switch data. In another example, the data message is formulated into packet data, and the message is sent to the telematics unit 24 over a packet switched network. In still another example, the data message is formulated into packet data which is then embedded into an SMS message, and is sent using an air interface communications link (e.g., 116) between the communications module 186 at the service center 124 and the telematics unit 24.

When the telematics unit 24 receives the message from the service center 124, the telematics unit 24 transmits a signal to the remote controller 18. This is shown at 304 in FIG. 3. In an example, the signal may be transmitted via the vehicle bus 134 (with or without the body control module 133 connecting the vehicle bus 134 to serial bus 151). In another example, the telematics unit 24 may send a data message directly to the remote controller 18 using short range wireless technology (such as via a BLUETOOTH® connection or the like) or via an SAE J9139 protocol. In the latter instance, the telematics unit 24 and the remote controller 18 each contain short range wireless connection units that are paired with one another. When short range wireless technology is utilized, the telematics unit 24 and the remote controller 18 must be within the short range wireless communication range (e.g., from about 10 m to about 100 m) in order to operate.

In an example, the signal transmitted from the telematics unit 24 to the remote controller 18 includes a command to execute the user's request; namely to activate the remote controller 18 to open or close the garage door 14. As shown at step 306 in FIG. 3, in response to the command received by the telematics unit 24, the remote controller 18 transmits an RF signal from its transmitter 32 to the receiver 34 that is operatively connected to the garage door opener 16. This signal is used, by the processor of the garage door opener 16, to initiate a mechanism responsible for physically opening or closing the garage door 14.

It is to be understood that the range for opening or closing the garage door 14 is limited to the radio frequency (RF) range between the transmitter 32 of the remote controller 18 and the receiver 34 of the garage door opening mechanism 16. Thus, when the controller 18 is activated on command by the telematics unit 24, the RF signal sent from the transmitter 32 cannot be received by the receiver 34 unless the transmitter 32 is within the RF range of the receiver 34. In instances where the transmitter 32 is outside the RF range of the receiver 34, the telematics unit 24 may have to resubmit the command one or more times until the transmitter 32 is within RF range of the receiver 34. The telematics unit 24 may be programmed to transmit with request for a predetermined number of times or for any number of times within a predetermined period. If the telematics unit 24 is not within the RF range at the end of the predetermined number of times or period, the telematics unit 24 will no longer transmit the signal.

In the examples disclosed herein, the remote controller 18 is operatively connected to the vehicle telematics unit 24, and thus provides a link between the vehicle 22 and the structure associated with the entryway 12 (e.g., a user's garage, house, etc.). As such, a user may have a single key (i.e., a physical key or a mobile communications unit that can contact the call center 124) to access both the vehicle 22 and the entryway 12.

An example of a method for monitoring the usage of the entryway 12 will be described in conjunction with FIGS. 1, 2, and 4. Via this example method, the telematics unit 24 in communication with the remote controller 18 disposed inside the vehicle 22 may be able to detect any unauthorized attempts to access an entryway, such as the entryway 12 shown in FIG. 1 using the remote controller 18. An unauthorized attempt to access the entryway 12 may include a breaking and entering into the vehicle 22, and while unlawfully inside the vehicle 22, an attempt to actuate the remote controller 18 by physically activating a button or other function associated with the controller 18 to open the garage door 14.

Figure 4:
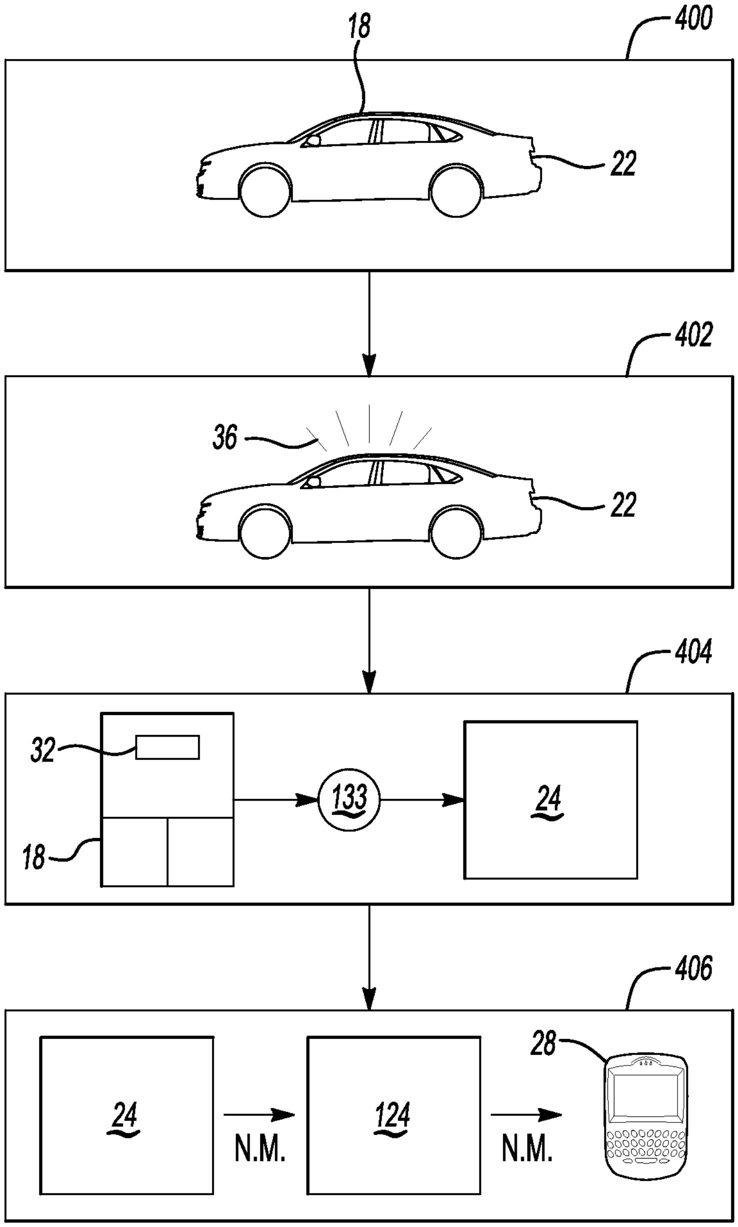
FIG. 4 is a flow diagram depicting an example of a method for monitoring an entryway.

Referring now to FIG. 4, the method of monitoring the entryway 12 includes activating an armed state of the vehicle 22 having the remote controller 18 disposed therein, as shown at step 400. In an example, the armed state of the vehicle 22 may be established upon activating the security system 30, and examples of activating the security system 30 are described above in conjunction with FIG. 1.

Once the vehicle 22 has been set into an armed state (i.e., upon activating the security system 30), the vehicle alarm 36 is automatically set into an activation-ready state. In the activation-ready state, the alarm 36 (whether the alarm 36 is a visual alarm, an audible alarm, etc.) may be triggered in response to the occurrence of an alarm-activating event. An example of this step is shown at 402 in FIG. 4. An alarm-activating event may include, for instance, the unauthorized attempted activation of the remote controller 18 when the vehicle 22 is in the armed state or an unauthorized entry into the vehicle 22 (i.e., into the passenger compartment 20) that is detectable by, e.g., one or more vehicle sensors 64.

In an example not shown in the drawings, the vehicle 22 is in the armed state, and an attempt is made to activate the remote controller 18 while the vehicle 22 is in this state. This may occur, for example, where an intruder is inside of the vehicle 22 while the armed state is active (i.e., the security system 30 has been activated, for example, upon activating a door locking function or the like as previously described). This scenario may also occur when the intruder enters the vehicle 22 while the vehicle 22 is in the armed state (e.g., by breaking a window or crawling through an open window and then attempting to activate the remote controller 18 once inside the vehicle 12). In the instant example, the body control module 133 recognizes the armed state of the vehicle 22, and places the remote controller 18 into a mode that prevents its activation until the vehicle 22 is no longer in the armed state. In instances where the remote controller 18 is connected to the bus 151 and communicates with the telematics unit 14 through the body control module 133 (i.e., the gateway), and when the attempt is made to activate the remote controller 18 while the vehicle 22 is in the armed state, the body control module 133 will receive a signal from the remote controller 18 and will wake up the telematics unit 24. The body control module 133 then transmits a signal to the telematics unit 24 informing the telematics unit 24 of the unauthorized attempt to activate the remote controller 18. In response, the telematics unit 24 sends a notification to the call center 124 indicating that an unauthorized attempt to access the entryway 12 has been made while the vehicle 22 is in the armed state. The call center 124 may then notify the user in any desirable manner.

It is to be understood that, when the gateway (e.g., 133) is involved, the body control module 133 will not directly prevent the activation of the remote controller 18, but may play some role in allowing the remote controller 18 itself to prevent the garage door from being opened. This may involve the remote controller 18 automatically placing itself into an activation prevention mode as soon as the remote controller 18 knows that the vehicle 22 has been placed into the armed state. Knowledge of the armed state may be obtained, for example, by receiving a message transmitted from the body control module 133 indicating that the armed state of the vehicle 22 has been activated.

Referring back to FIG. 4, as mentioned above, another alarm-activating event may include, for instance, the unauthorized entry into the vehicle 22 (i.e., into the passenger compartment 20) that is detectable by, e.g., one or more vehicle sensors 64. In one example, an unauthorized entry may include the opening of the driver- or passenger-side door without the use of a key while the vehicle 22 is in the armed state, the breaking of a window while the vehicle 22 is in the armed state, and/or the like. When the unauthorized entry is detected, the sensor(s) 164 (via, e.g., a processor that is operatively associated therewith) activates the alarm 36 (as shown at reference numeral 402 of FIG. 4) and sends a signal to the body control module 133. The body control module 133 wakes up the telematics unit 24 and activates a mode that prevents the remote controller 18 from being activated while the alarm 36 is triggered.

In any of the examples disclosed herein, upon triggering the alarm 36, a siren or other loud noise may be emitted from the vehicle 22, the vehicle headlights may flash, etc.

In the example shown in FIG. 4, after the alarm 36 has been triggered, another signal may be initiated in response to the detection that the remote controller 18 that is disposed inside the vehicle 22 has been attempted to be activated without authorization. This is shown at 404 in FIG. 4. As used herein, unauthorized attempted activation of the remote controller 18 includes the attempted activation of the remote controller 18 from inside the vehicle 22 (via, e.g., the actuation of a button associated with the controller 18, a verbal command to activate the controller 18, etc.) when the alarm 36 has been triggered or, as previously described, when the vehicle 22 is in the armed state (but the alarm 36 has not been triggered). Attempted activation may be accomplished, in an example, by a person who does not have authorization to be inside the vehicle 22. In the example shown in FIG. 4, since the activation of the alarm 36 triggers the body control module 133 to deactivate the remote controller 18, the attempted activation of the remote controller 18 will not open the entryway 12, but rather will generate the other signal, which is transmitted from the remote controller 18 (or from a processor that is operatively connected to the controller 18) to the body control module 133. This other signal (i.e., a notice) is automatically transmitted from the body control module 133 to the telematics unit 24 via the vehicle bus 134, as shown at step 404 of FIG. 4. This notice indicates, to the telematics unit 24, that an unauthorized attempt to activate the remote controller 18 has been made. Then, upon receiving the notice, the telematics unit 24 transmits a notification message (N.M.) to the telematics service center 124, as shown at 406 in FIG. 4.

The notification message may be sent, from the telematics unit 24, as a packet data message over a packet switched network. This notification message, which is sent to the service center 124, generally includes some indication (e.g., in the form of text, graphics, and/or both) that an unauthorized activation of the remote controller 18 has occurred. From this information, the communications module 186 at the service center 124, which receives the message from the telematics unit 24, forwards the message to an appropriate department or division at the service center 124 so that the message may be properly and efficiently processed. In one example, the notification message is sent to the vehicle safety and theft division at the service center 124.

When the notification message is processed, the service center 124, via suitable software programs run by the processor 184, generates another message intended to be sent to another entity, such as to the vehicle owner (as shown at step 406 of FIG. 4). This other message may include text and/or graphics indicating to, e.g., the vehicle owner that his/her vehicle 22 is then-currently being used as a means for attempting to gain unauthorized access into a particular space (such as into the vehicle owner's home through the garage door 14). In an example, the processor 184 refers to the user profile to obtain the mobile dialing number of the vehicle owner's mobile phone, and sends the notification message as a voice message or a short message service (SMS) message to the communications device 28 of the vehicle owner. In instances where a voice message is sent, the notification message may be converted from text to speech using a speech conversion program run by the processor 184, and a recording of the speech may be sent, as a voice message, during a voice connection with the vehicle owner's mobile phone. In instances where an SMS message is sent, the message (in text form) may be sent directly to the vehicle owner's mobile phone through a short message service controller (SMSC). In yet another example, the message may be formulated as an electronic mailing (e-mail) message, and the message may be sent to an e-mail account of the vehicle owner.

Although the vehicle owner has been identified above as one entity that may receive the notification message from the call center, it is to be understood that other entities may be designated to receive notification messages. The other entities may include any person identified in the user profile as being authorized to receive the messages, or any third party organization (such as a police station, a fire house, etc.) also identified in the user profile as being authorized to receive the messages. In some instances, the service center 124 may automatically send the notification message to the vehicle owner unless the user profile indicates otherwise.

Referring back to step 404 in FIG. 4, in an example, upon initiating the signal when the unauthorized attempted activation of the remote controller 18 has been detected, the method further includes controlling at least one vehicle system. More specifically, upon receiving the signal from the controller 18 that the controller 18 has been attempted to be activated while the vehicle 22 is in the armed state or the alarm 36 has been triggered, the telematics unit 24 may generate a signal directed to one or more vehicle systems, e.g., to deactivate such systems. For instance, the telematics unit 24 may send a signal to the vehicle ignition system to disallow any activation of the ignition system while the vehicle 22 is in the armed state. In another example, the telematics unit 24 may send a signal to the vehicle locking system to automatically lock all of the vehicle locks so that the person who entered the vehicle 22 without authorization is locked inside the vehicle 22 while the vehicle 22 is in the armed state.

While several examples have been described in detail, it will be apparent to those skilled in the art that the disclosed examples may be modified. Therefore, the foregoing description is to be considered non-limiting.

The invention claimed is:

1. An entryway control and monitoring system, comprising:

a vehicle including an armed state that is actuatable upon setting a vehicle ignition to an OFF state and activating a vehicle door-lock function;

a remote controller being disposed in the vehicle;

a telematics unit disposed in the vehicle;

any of i) a vehicle bus operatively connecting the remote controller to the telematics unit, or ii) respective short range wireless connection units disposed in each of the remote controller and the telematics unit and selectively operatively connecting the remote controller and the telematics unit; and the remote controller having: 1) an activation mode in which the remote controller is configured to open or close an entryway; 2) an activation prevention mode in which the remote controller is configured to not open the entryway and to generate and send a signal indicating that an unauthorized attempt to activate the remote controller from inside the vehicle has been made, the remote controller to enter the activation prevention mode in response to recognition of the armed state and to return to the activation mode in response to recognition of deactivation of the armed state.

2. The system as defined in claim 1, further comprising:

a telematics service center in selective communication with the telematics unit; and a mobile communications device for submitting a request to the telematics service center to activate the remote controller to one of open or close the entryway.

3. The system as defined in claim 2 wherein the telematics service center includes a communications module to transmit a signal to the telematics unit to activate the remote controller in response to the request.

4. The system as defined in claim 3 wherein the telematics unit is configured to transmit a signal to the remote controller via the vehicle bus, the signal including a command to execute the request.

5. The system as defined in claim 1, further comprising a body control module operatively connected to each of the vehicle bus and the telematics unit.

6. The system as defined in claim 5 wherein in the activation prevention mode, the remote controller is further configured to send the signal to the body control module which sends a notification to the telematics unit indicating that the signal has been initiated, the notification being sent via the vehicle bus.

7. The system as defined in claim 6 wherein the telematics unit is configured to send a notification message to a telematics service center indicating that the signal has been initiated, the telematics service center including a communications module to send an other message to a mobile communications device of a vehicle owner also indicating that the signal has been initiated.

8. The system as defined in claim 1 wherein the remote controller is a universal garage door opener, and wherein the entryway is a garage door.

9. A method for monitoring usage of an entryway, comprising:

activating an armed state of a vehicle, the vehicle having disposed therein a remote controller for access to the entryway;

in response to the activation of the armed state, the remote controller entering an activation prevention mode in which the remote controller is configured to not open the entryway and to generate and send a signal indicating that an unauthorized attempt to activate the remote controller from inside the vehicle has been made;

recognizing, by the remote controller in the activation prevention mode, an unauthorized attempt to activate the remote controller from inside the vehicle;

initiating the signal from the remote controller while the armed state is activated and in response to the unauthorized attempt to activate the remote controller from inside the vehicle;

automatically transmitting a notice from the remote controller to a telematics unit operatively disposed in the vehicle, the notice indicating that the signal has been initiated; and upon receiving the notice, transmitting a notification message from the telematics unit to a telematics service center.

10. The method as defined in claim 9 wherein the activating of an armed state occurs upon setting a vehicle ignition to an OFF state and activating a vehicle door-lock function.

11. the method as defined in claim 9 wherein the notification message to the telematics service center includes an indication that the signal has been initiated, and wherein upon receiving the notification message, the method further comprises sending an other message to a mobile communications device of a vehicle owner, the other message indicating that the unauthorized attempt to activate the remote controller for access to the entryway has been recognized.

12. The method as defined in claim 11 wherein the other message is one of a voice message, a short message service (SMS) message, or an electronic mail (e-mail) message.

13. The method as defined in claim 9 wherein upon initiating the signal, the method further comprises, via the telematics unit, controlling at least one vehicle system.

14. The method as defined in claim 9 wherein prior to initiating the signal, the method further comprises triggering an alarm in response to an unauthorized entry into the vehicle.

15. The method as defined in claim 9, further comprising the remote controller returning to an activation mode from the activation prevention mode in response to recognizing that the vehicle is no longer in the armed state.

16. The method as defined in claim 13, further comprising any of:

sending an other signal to disallow any activation of an ignition system of the vehicle while the vehicle is in the armed state; or sending an other signal to a vehicle locking system to automatically lock any locks of the vehicle.

* * * * *